United States Patent [19]

May, III et al.

[11] Patent Number: 5,406,844
[45] Date of Patent: Apr. 18, 1995

[54] RESERVOIR SIGHT GLASS ASSEMBLY FOR MATERIAL PROCESSING MACHINE

[76] Inventors: Peter May, III; Daniel T. Harnish, both of 2792 Loker Ave. West, Suite 101, Carlsbad, Calif. 92008

[21] Appl. No.: 134,275

[22] Filed: Oct. 8, 1993

Related U.S. Application Data

[62] Division of Ser. No. 859,147, Mar. 27, 1992, Pat. No. 5,252,008.

[51] Int. Cl.⁶ ............................................. G01F 23/02
[52] U.S. Cl. .................................... 73/323; 209/223.1
[58] Field of Search ................. 73/323, 325, 326, 328; 209/213, 215, 223.1; 250/900; 285/345; 340/619

[56] References Cited

U.S. PATENT DOCUMENTS

| | | |
|---|---|---|
| 349,422 | 9/1886 | Bartlett ............................ 209/223.1 |
| 2,466,316 | 4/1949 | Jovanovich ......................... 285/345 |
| 3,239,278 | 3/1966 | Mueller et al. . |
| 3,990,730 | 11/1976 | Ekman ............................. 285/345 X |
| 4,023,279 | 5/1977 | Janda . |
| 4,144,012 | 3/1979 | Pinkley ............................ 209/223.1 |
| 4,235,563 | 11/1980 | Hine et al. ............................ 406/23 |
| 4,306,970 | 12/1981 | Tanaka et al. ..................... 209/223.1 |
| 4,379,663 | 4/1983 | Allison ............................... 406/23 |
| 4,411,388 | 10/1983 | Mack . |
| 4,411,389 | 10/1983 | Harrison . |
| 4,430,494 | 2/1984 | Hönel et al. . |
| 4,599,016 | 7/1986 | Medemblik . |
| 4,812,086 | 3/1989 | Kopernicky . |
| 4,834,586 | 5/1989 | Depew . |
| 4,888,990 | 12/1989 | Bryan et al. ......................... 73/323 |
| 5,252,008 | 10/1993 | May, III et al. ....................... 406/23 |

FOREIGN PATENT DOCUMENTS 104830  6/1983  Japan ................................. 209/213

Primary Examiner—William A. Cuchlinski, Jr.
Assistant Examiner—Willie Morris Worth
Attorney, Agent, or Firm—Wagner & Middlebrook

[57] ABSTRACT

A reservoir sight glass assembly forming part of a material transfer system for loading lightweight granular plastic material into injection molding machines and the like is connected to the associated machine and to a light weight pressure relief chamber attached to the reservoir sight glass assembly, both connections being by quick disconnect devices. The reservoir sight glass assembly includes a sensor adjustably positioned against the sight glass which responds to the level of material in the reservoir sight glass assembly and a magnet assembly which traps ferrous contaminants and prevents their entering the machine. The flow of material to the pressure relief chamber is controlled by the sensor which turns a regulated source of compressed air on or off depending upon the sensed level of material in the reservoir sight glass assembly. The magnetic assembly includes a pivotable mounting for a pair of magnets which, in one position, create a magnetic field across the reservoir sight glass assembly and in another position, employed when the reservoir sight glass assembly is removed from the associated machine, to effectively remove the magnetic field permitting any trapped ferrous contaminants to drop out of the reservoir sight glass assembly.

15 Claims, 3 Drawing Sheets

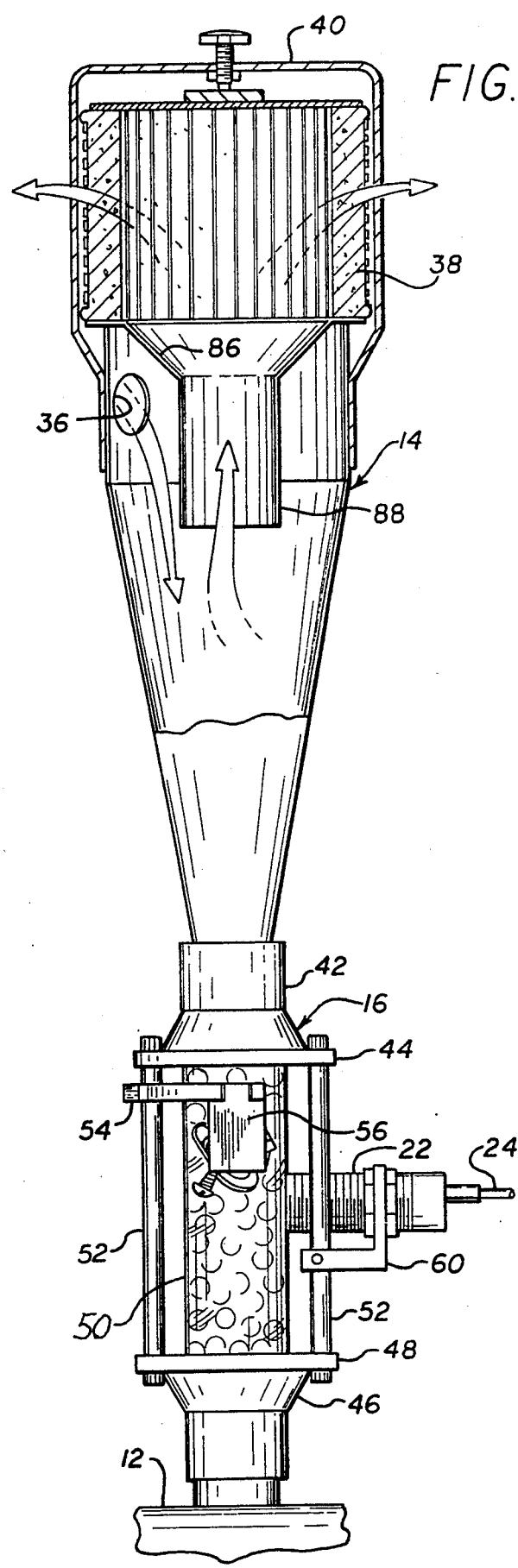
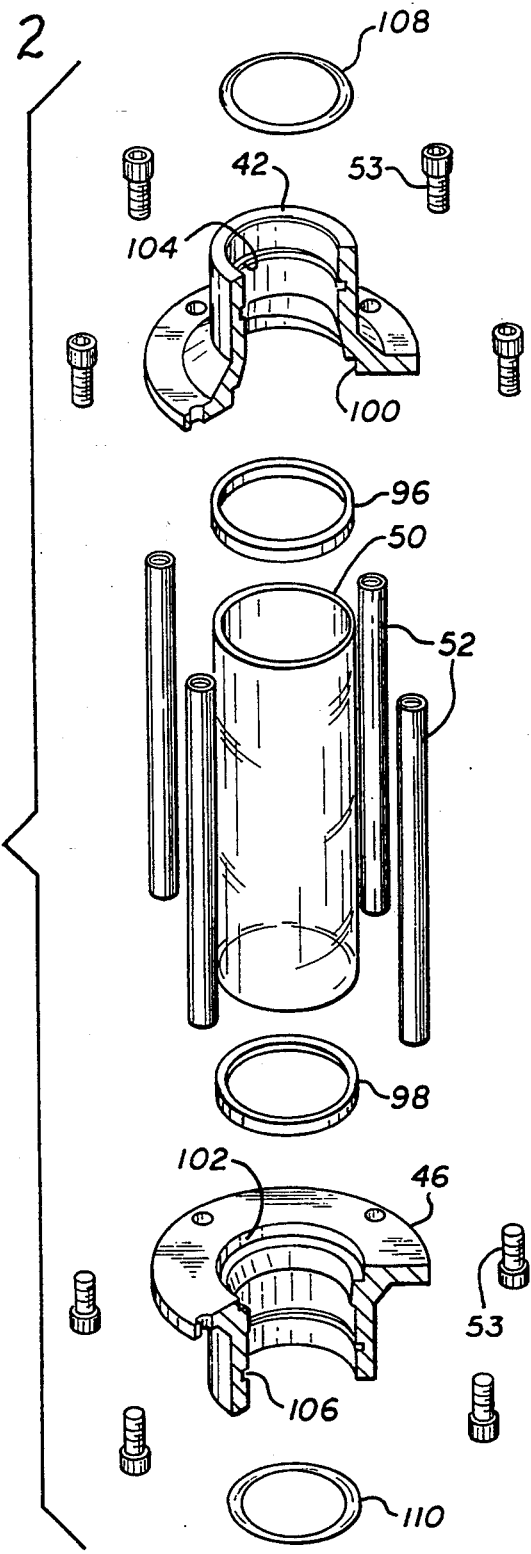
FIG. 2
FIG. 4

RESERVOIR SIGHT GLASS ASSEMBLY FOR MATERIAL PROCESSING MACHINE

BACKGROUND OF THE INVENTION

This invention relates to a reservoir and sight glass assembly for a material processing machine and more particularly to a sight glass assembly having particular application to a system for transferring granular plastic materials into processing machines such as injection molding machines, extruders, blow molding machines, and material dryers. This application is a division of application Ser. No. 07/859,147 of Peter May II et al filed Mar. 27, 1992 now U.S. Pat. No. 5,252,008 and assigned to Autoload, Incorporated.

Machines for loading granular plastic materials into injection molding machines and the like have been available for a considerable period of time. Such machines normally include a large hopper assembly placed on top of injection molding machines and the like, making them very difficult to maintain and service.

In addition to the hopper, means are required for loading the hopper, normally an electrically driven vacuum motor. A number of problems have become manifest in the use of such machines. Typically the vacuum motor is very noisy, consumes considerable electricity and is dirty in that it blows fines of the material into the atmosphere. Such motors also require brushes that frequently wear out and have to be replaced. Frequently the machines currently in use also require expensive filter systems that have to be cleaned and replaced often. It is not unknown for such systems to become partially or entirely plugged, making it necessary to clean them out. They also have to be cleaned out after each run of a particular material to keep contamination to a minimum. Where such systems are on top of large hoppers on top of injection molding machines and the like, it becomes necessary for someone to climb up on the machine to effect the cleaning or maintenance. Sometimes machine components are broken, materials are spilled and wasted, or people are injured in falls in the course of effecting such cleaning because of the inaccessibility of such systems. It is an object of the present invention to provide a reservoir sight glass assembly for a loading system in which the loading process is considerably simplified and in which components for cleaning are readily accessible and easily handled from the floor.

Another area in which prior art machines appear to be unsatisfactory is that the various parts are not easily disassembled for cleaning. It is an object of the present invention to provide a reservoir sight glass assembly for a material loading system in which the components are quickly and easily disassembled for cleaning by means of slip fit joints with O-ring seals.

Because of the fact that metal fragments and components sometimes find their way into the material it is known to provide a magnetic field somewhere in the system to trap such fragments and components. Disassembly to remove such metal fragments and components has generally involved a considerable expenditure of time. It is another object of the present invention to provide a reservoir sight glass assembly including magnetic means in which the arrangement for removing such metal fragments and components is substantially facilitated.

Other objects and advantages will become apparent from consideration of the following specification taken in combination with the accompanying drawings.

BRIEF DESCRIPTION OF THE INVENTION

Applicants have designed a reservoir sight glass assembly for a material transfer system particularly for handling granular plastic materials which are supplied to machines such as injection molding machines and the like, (but which can also convey and load other lightweight granular materials,) which meets the above objectives. By using a comparatively small lightweight pressure relief chamber combined with a reservoir sight glass assembly attached to each other with a slip fit quick disconnect means having O-rings sealing the joint, and with the sight glass assembly similarly connected to the machine mounting plate of the associated machine, removal and replacement for cleaning of both the pressure relief chamber and the reservoir sight glass assembly is facilitated. The filter unit which forms part of the pressure relief chamber is similarly easy to remove and clean and/or replace as required.

Applicant's loading system also includes a very simple magnetic structure attached to the reservoir sight glass assembly which creates a magnetic field across the assembly and which is effective to trap ferrous metal objects which might otherwise damage the associated machine. By using simple manually pivotable magnetic members, the magnetic field is easily interrupted to permit the metallic objects to be released from the reservoir sight glass assembly while it is removed from the machine mounting plate for cleaning.

Also attached to applicants' reservoir sight glass assembly is a sensor which effectively looks through the reservoir sight glass and distinguishes whether material is present at its level in the reservoir sight glass assembly. This sensor is adjustable as to its level on the reservoir sight glass assembly and so can determine the starting charge of material and load the needed charge of material for the associated machine automatically. This also avoids the need for supplying a large hopper since the system can respond quickly to supply the amount of material needed to be supplied to the associated machine for each machine cycle.

BRIEF DESCRIPTION OF THE DRAWINGS

This invention may be more clearly understood from the following detailed description and by reference to the drawings in which:

FIG. 2 is an enlarged side view, partly in section, of the reservoir sight glass assembly of FIG. 1;

FIG. 4 is an exploded view, partly in section, of the reservoir sight glass assembly of FIGS. 1 and 2;

DETAILED DESCRIPTION OF THE INVENTION

Figure 1:
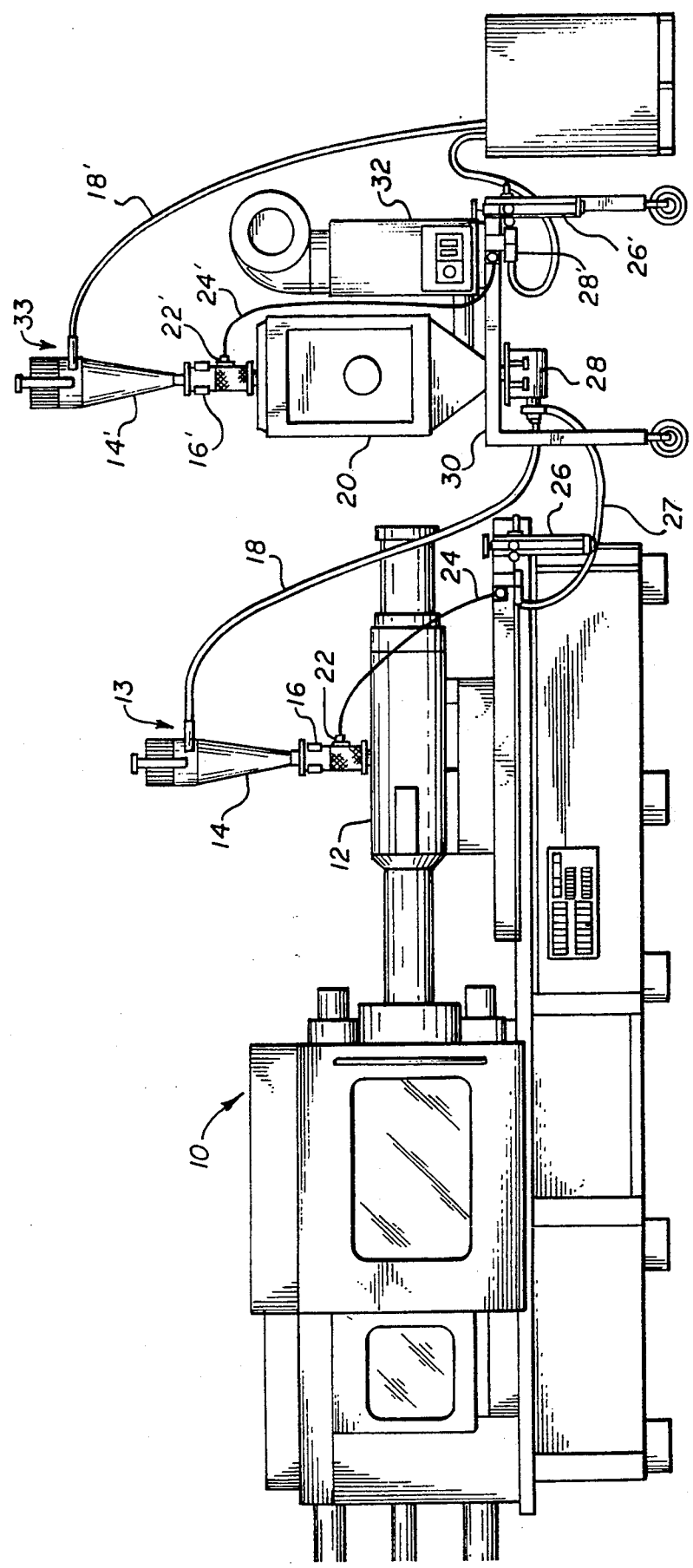
FIG. 1 is a side view of an injection molding machine including a material loading system having a reservoir sight glass assembly incorporating our invention.

Referring to FIG. 1, an injection molding machine is shown at numeral 10 having an input chamber or throat 12 for receiving a desired amount of granular plastic material for each cycle of its operation. Connected to the input chamber or throat 12 is a loading system 13 including a pressure relief chamber 14 and a reservoir sight glass assembly 16 which receives material from the pressure relief chamber. A conduit 18 carries plastic material from a source, which in this case is a dryer 20, to a tangential inlet duct 21 on the pressure relief chamber 14. A sensor 22 fastened to the side of the reservoir sight glass assembly 16 is connected through an insulated wire 24 to an air pressure regulator 26 which controls the supply of air to an accelerator and vortex unit 28. Air supplied to the regulator 26 from a source of compressed air, not shown, is controllably supplied, through an air hose 27 to accelerator and vortex unit 28. Material from dryer 20 is caused to flow by air pressure, through the acceleration and vortex unit 28 and through conduit 18 to the pressure relief chamber 14. When the material supplied reaches a desired level in reservoir sight glass assembly 16, this is sensed by sensor 22 which sends a signal to the air pressure regulator to shut off the air supplied through air hose 27 to the acceleration and vortex unit 28.

The dryer 20 which is carried on a separate cart 30, includes a blower and heating unit 32. Mounted on the top of dryer 20 is a second loading system 33 which includes a pressure relief chamber 14 and a reservoir sight glass assembly 16. Transfer system 33 is essentially identical to transfer system 13 wherein identical parts will be given the same numerals plus a prime. A container 34 containing a supply of plastic granules is connected through a conduit 18' to pressure relief chamber 14'. Carried on cart 30 is an air pressure regulator 26' connected to an air pressure source (also not shown), to a sensor 22' on reservoir sight glass assembly 16' through a wire 24', and to an accelerator and vortex unit 28'. As described above, the sensor 22' on reservoir sight glass assembly 16' responds to the level of granulated plastic material in the reservoir sight glass assembly to cause air pressure regulator 26' to either supply air to the accelerator and vortex unit 28' to cause material to flow through conduit 18' to pressure relief chamber 14' or to shut off the supply of air and, hence, the flow of material to pressure relief chamber 14'. FIG. 1 shows a system in which two of my loading systems are shown connected in series.

FIG. 2 is an enlarged view showing part of loading system 13 in greater detail including pressure relief chamber 14 and reservoir sight glass assembly 16. A duct 36 receives material and air from the tangentially attached inlet duct 21 to which conduit 18 is attached. A filter unit 38 is located at the upper end of pressure relief chamber 14. A fastening bracket 40 provides means for securing and removing the filter unit 38 from pressure relief chamber 14.

Reservoir sight glass assembly 16 includes an upper end bell member 42 including a flange 44, a lower end bell member 46 including a flange 48, a sight glass 50 secured between the flanges and four support rods 52 which cooperate with a plurality of screws 53 (see FIG. 4) to hold the flanges 44 and 48 and reservoir sight glass 50 together. Secured to two of rods 52 is a magnetic unit including a bracket 54 and a pair of magnetic members 56, 58 (of which only member 56 is visible in this view) pivotally attached to bracket 54. A sensor 22 is fastened to the side of reservoir sight glass 50 by means of a bracket 60 adjustably secured to a pair of support rods 52 to control the level of material in the sight glass. Sensor 22 is connected through wire 24 to a switch (not shown) operating an air valve forming part of air pressure regulator 26 which is connected to a source of compressed air.

When air under pressure is supplied from regulator 26 through air hose 27 to the accelerator and vortex unit 28, a vacuum is created upstream of passages 82 which pulls the lightweight granular material from it source such as dryer 20 and causes it to flow through conduit 18 to tangential inlet duct 21 and port 36 shown in the sidewall of pressure relief chamber 14. An interior cone 86 and a cylindrical baffle 88 formed in the top of pressure relief chamber 14 cause the flow from port 36 to be directed downwardly as shown by the arrow. In general the air flow will carry all the solids toward the bottom of the pressure relief chamber and into reservoir sight glass assembly 16. Since the air must escape however, it flows through the passage at the center of baffle 88 and radially outwardly through the filter unit 38. Inevitably some fines will be carried by this air flow and they are blocked by the filter from escaping into the atmosphere. The filter 38 is readily removable for cleaning by loosening the screw on bracket 40 and sliding the filter laterally.

In this view of the reservoir sight glass assembly 16, the magnetic members 56 and 58 (only member 56 is visible) are shown in the lowered position in which they create a significant magnetic field across the reservoir sight glass. A number of magnetic members such as a paper clip, a screw and a washer are shown held in this magnetic field.

Figure 3:
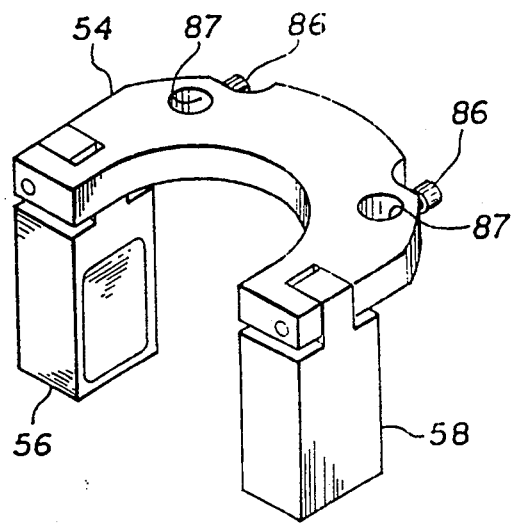
FIG. 3 is a perspective view of a magnetic unit used in association with the structure of FIGS. 1 and 2.

The purpose of the magnetic members 56, 58 is to create a field in which ferrous metal contaminants may be caught and prevented from entering the associated machine. FIG. 3 is a perspective view of the magnetic assembly alone with members 56 and 58 shown in the lowered position creating a strong magnetic field between these members. Magnetic members 56 and 58 are pivotally attached to bracket 54. This view also shown screws 86 which are turned inward to secure the magnetic assembly to support rods 52 which pass through bores 87 in bracket 54.

An exploded view of the reservoir sight glass assembly 16 is shown in FIG. 4 with the sensor and the magnetic unit removed. In this view it will be observed that the assembly consists of a sight glass tube 50 which is secured between upper and lower end bell members 42 and 46 respectively. Circular seal members 96 and 98 are positioned between the sight glass tube 50 and end bell members 42 and 46, respectively. A plurality of support rods 52 are bolted to the upper and lower end bell members 42, 46 by means of a plurality of screws 53. In addition to grooves 100, 102 for receiving seals 96 and 98 respectively, end bell members 42 and 46 include internal grooves 104 and 106, which receive O-rings 108 and 110 respectively and which provide an air tight seal against the lower end of the pressure relief chamber 14 and a fitting (not shown) on a mounting plate of the machine input chamber 12. Those skilled in the art will quickly recognize that with the reservoir sight glass assembly connected as described, the pressure relief chamber 14 may be easily disconnected from the top of the reservoir sight glass assembly 16 and the sight glass assembly is similarly easy to remove from the associated machine.

Figure 5:
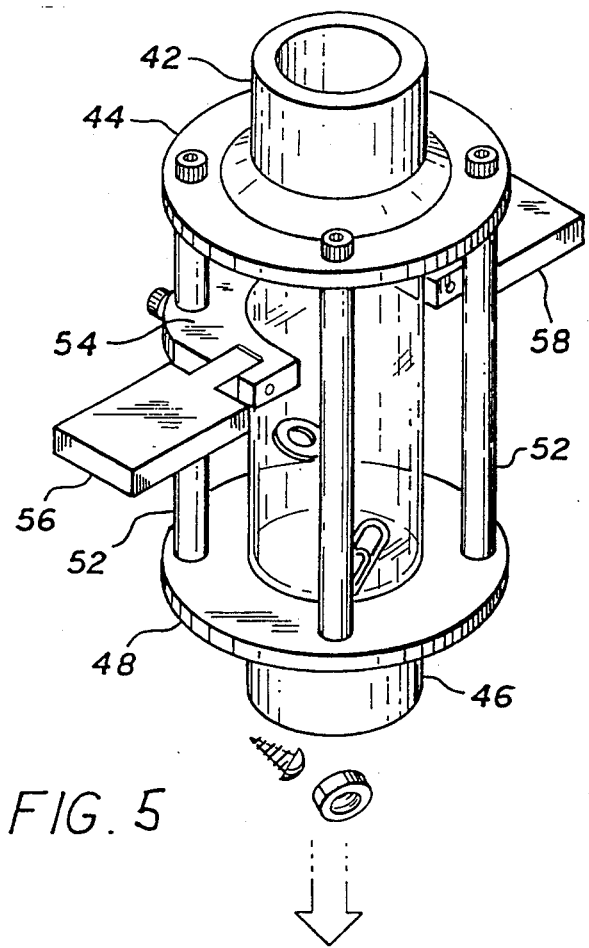
FIG. 5 is a perspective view of the reservoir sight glass unit of FIGS. 2 and 4 with the magnetic unit of FIG. 3 shown in an alternate position.

FIG. 5 is a perspective drawing of reservoir sight glass assembly 16 (with the sensor 22 removed) which is attached to pressure relief chamber 14 and to the input chamber or throat 12 of the machine 10 by the quick disconnect slip fit, O-ring sealed joints described above.

When the view through the sight glass indicates that there are undesirable ferrous metal objects in the magnetic field between magnetic members 56 and 58, this assembly 16 may readily be removed (after shutting off the air supply) and the magnetic members 56 and 58 manually pivoted to the horizontal position shown which effectively removes the magnetic field, permitting the metallic objects, shown here as a washer, a paper clip, a screw and nut, to simply drop out of the assembly. At this point the pressure relief chamber 14 itself is readily disassembled for cleaning, if desired. The reservoir sight glass assembly 16 may then be quickly reattached to the pressure relief chamber 14 and throat 12, and the air supply again turned on, until the level of material in the reservoir sight glass sensed by the sensor 22 is at the point where the sensor 22 will cause the air pressure regulator 26 to discontinue supplying more material to the pressure relief chamber 14.

From the foregoing it will be appreciated that the reservoir sight glass assembly described herein affords some significant advantages over earlier systems presently in use. By using quick disconnect slip fit fittings with O-rings to connect the reservoir sight glass assembly 16 to the throat 12 and the pressure relief chamber 14, both the pressure relief chamber and reservoir sight glass assembly are easily removed, cleaned and replaced in the system. The pressure relief chamber 14 and the reservoir sight glass assembly 16 are relatively small and easily handled from the floor level so there is no need to climb up on the associated machine. By locating the magnetic members on the reservoir sight glass assembly, magnetic objects in the reservoir sight glass are easily seen, identified and removed.

The above described embodiment of the present invention is merely descriptive of its principles and is not to be considered limiting. The scope of the present invention instead shall be determined from the scope of the following claims including their equivalents.

We claim:

1. For use with a material transfer system for a processing machine having an input chamber for receiving measured quantities of granular materials from a source of said materials,
   a reservoir sight glass assembly for connection to said input chamber said assembly comprising a sight glass, upper and lower end bells, means fastening said end bells to said sight glass including a plurality of support rods and means securing said end bells to said support rods, and a level sensor and means supporting said level sensor on at least one of said support rods adjacent said sight glass, and
   quick disconnect means for connecting said reservoir sight glass assembly to said input chamber.

2. A reservoir sight glass assembly as claimed in claim 1 wherein means are provided for adjustably fastening said level sensor to said at least one support rod for support at a plurality of positions along said support rod.

3. For use with a material transfer system for a processing machine having an inlet port for receiving measured quantities of granular materials,
   a reservoir sight glass assembly for connection to said inlet port comprising a sight glass and upper and lower end bells, and means fastening said end bells to said sight glass, said end bells including cylindrical connecting members having internal grooves and O-rings in said grooves, one of said end bells for sealing against said inlet port,
   said fastening means including a plurality of support rods and threaded members securing said end bells to said support rods; and
   a level sensor, and means fastening said level sensor to at least one of said support rods adjacent said sight glass.

4. A reservoir sight glass assembly as claimed in claim 3 wherein a magnetic assembly is provided and fastening means are included attaching said magnetic assembly to at least one of said support rods, said magnetic assembly including a pair of magnetic members positioned to create a magnetic field across said sight glass.

5. A material transfer system for a processing machine having an input chamber, said material transfer system including a pressure relief chamber, control means for supplying material to said pressure relief chamber, and a reservoir connected to receive said material from said pressure relief chamber including an outlet conduit for carrying said material to said input chamber;
   characterized in that said reservoir comprises a reservoir sight glass assembly including a sight glass, upper and lower end bell members and means fastening said end bell members to said sight glass, said end bell members having internal passages therein, said upper end bell member being attached to said pressure relief chamber and said lower end bell member being attached to said input chamber, and quick disconnect means in said internal passages including internal grooves in said passages and O-ring seals in said grooves for connecting and disconnecting said reservoir sight glass assembly from said pressure relief chamber and said input chamber; and
   a level sensor and means fastening said level sensor against said sight glass, and means connecting said level sensor to said control means for controlling the flow of said material to said system.

6. A reservoir sight glass assembly as claimed in claim 5 wherein said fastening means includes a plurality of support rods fastened to said end bell members.

7. A reservoir sight glass assembly as claimed in claim 6 wherein means are provided for adjustably fastening said level sensor to at least one of said support rods for support at a plurality of positions along said support rod.

8. A material transfer system as claimed in claim 5 wherein magnetic means are provided adjacent said reservoir assembly, including fastening means for fastening said magnetic means to said assembly, said magnetic means further including a pair of magnetic members positioned to create a magnetic field across said reservoir sight glass.

9. A material transfer system as claimed in claim 8 wherein said magnetic means includes a bracket, said magnetic members are pivotally connected to said bracket, and means are provided for pivoting said magnetic members to a position to substantially reduce the strength of said magnetic field.

10. A material transfer system as claimed in claim 8 wherein during disconnecting of said reservoir unit from said machine, means are provided for pivoting said magnetic members to substantially reduce the strength of said magnetic field to release ferrous metal objects from said sensor and reservoir sight glass unit.

11. For use with a material transfer system for a materials processing machine having a throat for receiving materials and means mounting said system on said machine at said throat, said system being connected to a source of said materials:
    a sensor and reservoir sight glass unit fastenable to said mounting means, said unit including a sight glass, a level sensor, means fastening said level sensor to said unit against said sight glass and means for adjusting the level of said level sensor relative to said sight glass;
    quick disconnect means incorporated in said sensor and reservoir sight glass unit to enable facile removal of said sensor and reservoir sight glass unit from said machine; and
    control means responsive to said level sensor for controlling the flow of said materials to said unit.

12. A reservoir sight glass assembly as claimed in claim 11 wherein said unit includes upper and lower end bell members attached to said sight glass, said end bell members having internal passages, and said quick disconnect means includes internal grooves in said passages and O-ring seals in said grooves.

13. A reservoir sight glass assembly as claimed in claim 12 wherein said unit includes a plurality of support rods are fastened to said end bell members for securing said end bell members to said sight glass.

14. A reservoir sight glass assembly as claimed in claim 13 wherein said means for fastening said level sensor includes means for adjustably fastening said level sensor to said at least one of said support rods for support at a plurality of positions along said support rod.

15. A reservoir sight glass assembly as claimed in claim 11 wherein said unit includes magnetic means for separating ferrous contaminants, said magnetic means having a first position wherein a magnetic field is impressed across said sight glass and a second position wherein there is essentially no magnetic field across said sight glass.

* * * * *